Inventor
Fritz Salzmann
By
Attorneys

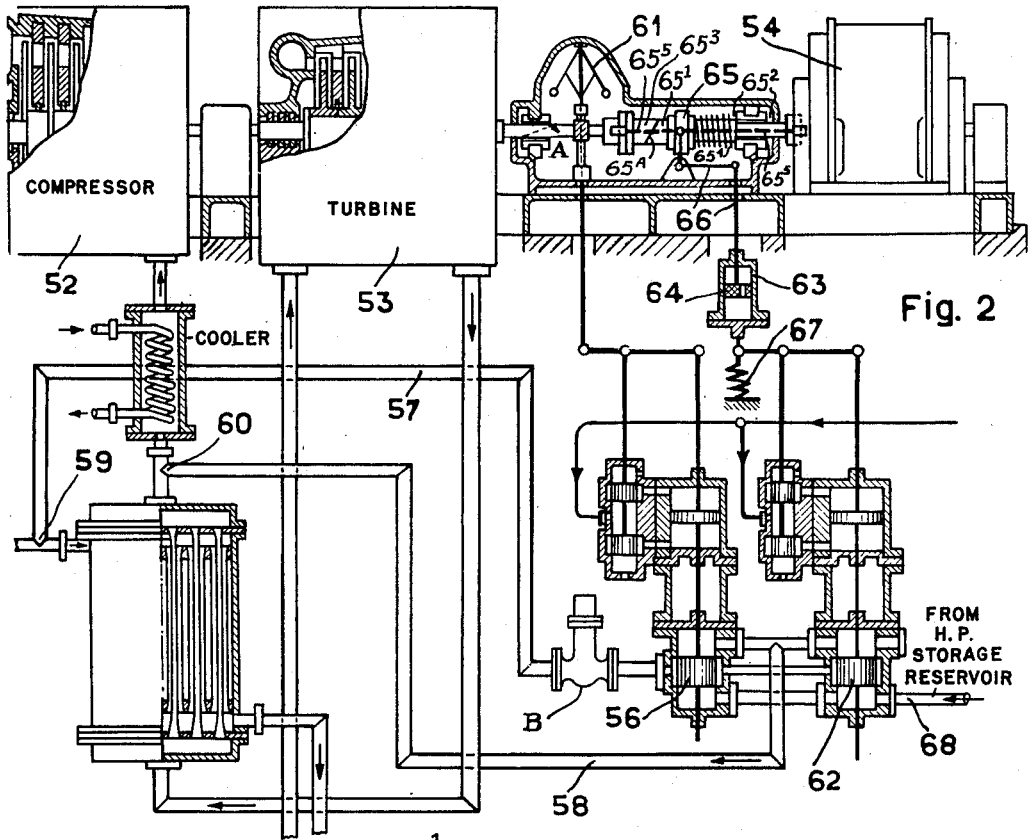
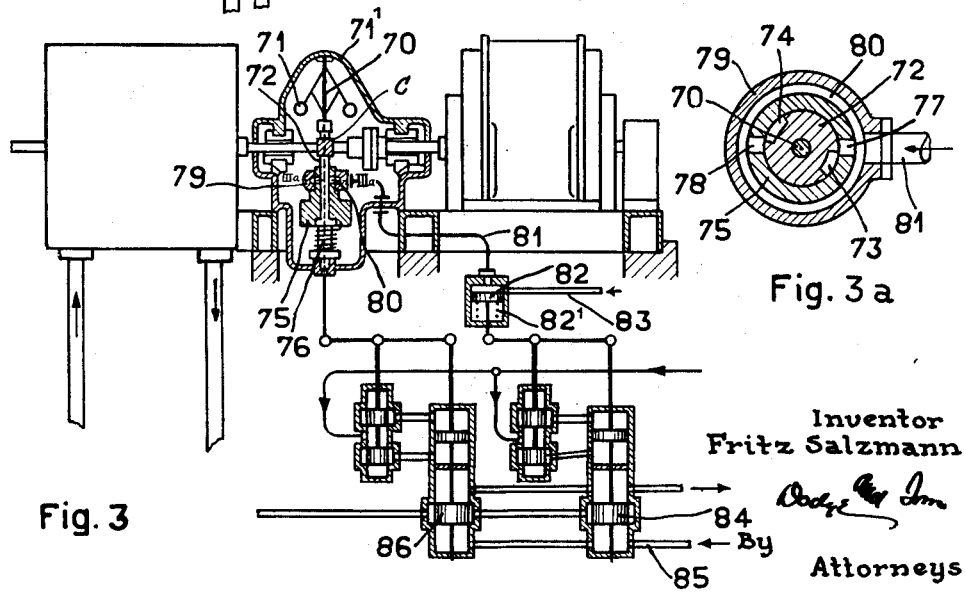

UNITED STATES PATENT OFFICE 2,495,604

METHOD OF AND APPARATUS FOR CONTROL OF THERMAL POWER PLANTS OF THE CLOSED CIRCUIT TYPE

Fritz Salzmann, Zurich, Switzerland, assignor to Aktiengesellschaft-Fuer Technische Studien, Zurich, Switzerland, a corporation of Switzerland Application February 7, 1945, Serial No. 576,542
In Switzerland December 29, 1943

Section 1, Public Law 690, August 8, 1946
Patent expires December 29, 1963

6 Claims. (Cl. 290—2)

The invention relates to a method for regulating the output of thermal power plants, in which at least the greater part of a gaseous working medium, preferably air, describes a closed circuit, is raised in at least one compressor to a higher pressure, then heated by a supply of heat from an external source and afterwards expanded in at least one turbine. The invention further relates to an arrangement for carrying out this method.

For regulating the output of plants of the kind referred to it has already been proposed to vary the density of the working medium within the whole circuit, without altering the speeds of the turbine and compressor, by supplying working medium to the circuit and withdrawing such medium from the latter in such a manner that the density is at every point of the circuit approximately proportional to the power momentarily given up by the turbine to an external source. In this connection the supply or withdrawal of working medium can, in principle, take place at any point of the circuit. However, as is known, a variation of the output takes place with greater rapidity if the supply or withdrawal of working medium is effected at some point of the high-pressure section of the circuit, i. e. between the discharge from the compressor and the inlet to the turbine. Since in this section of the circuit the pressure rises more quickly when working medium is introduced and drops more quickly when such medium is withdrawn than is the case in the low-pressure section of the circuit that is filled with expanded working medium, the turbine works with an increased or reduced pressure drop. As a consequence of this the useful output given up externally varies temporarily with greater rapidity than corresponds to the variation in density of the circulating working medium.

In accordance with other known regulating methods, working medium withdrawn from the high-pressure section when reductions in load occur is returned as a short circuit current and without performing any work in the turbine to the low-pressure section of the circuit, i. e. to a point between the discharge from the turbine and the inlet to the compressor, in order to reduce the pressure drop dealt with by the turbine.

However, when regulating according to this method sudden changes of load can still give rise to hunting in the circuit, since the volumes of working medium contained in the circuit cause a delay in the occurrence of the regulating operations which can easily be the cause of over-regulation. Needless to say, the stability of the regulation suffers from such hunting and the consequence of over-regulation is that when a regulating action takes place more working medium is supplied to the circuit or withdrawn therefrom than is really necessary for bringing about the required adaptation to the change in load; this gives rise to loss of output and calls for the installation of larger air reservoirs.

In order to avoid these various drawbacks, the method for regulating the output according to the present invention provides, when sudden changes in the useful output taken up by the consumer of such output occur, for a quantity of working medium being suddenly and for a brief period withdrawn from the high-pressure section of the circuit should a drop in load be concerned, whilst inversely a quantity of working medium is suddenly and for a short period supplied to said section when an increase in load takes place, said quantities being only a fraction of those which at least have to be supplied to or withdrawn from the high-pressure section for the purpose of effecting the regulation required in connection with the particular change in load to be dealt with; the remaining quantity of working medium is then gradually withdrawn or supplied over a longer period. Consequently a regulation of output according to the new method takes place in two stages, during the first of which an immediate adaptation to any change in the useful output that has occurred is brought about by increasing or reducing the pressure drop dealt with by the turbine. During the second stage, which can extend over a relatively long period, either the density of the circulating working medium is varied proportionately to the change in output that has taken place, or, in the case of a reduction in load, instead of reducing the density of the circulating medium the pressure drop dealt with by the turbine is reduced by allowing part of the working medium to flow for the time being as a short circuit from a point of the high-pressure section of the circuit back to a point of the low-pressure section. With the quantities of working medium supplied to or withdrawn from the high-pressure section of the circuit when sudden changes in load occur and which quantities are dosed proportionally to such changes, proper load regulation can for the greater part already be brought about during the first stage, so that, for example, a speed regulation in the second stage only has to act in a slightly corrective sense. In the case of a thermal power plant of high efficiency in which a recovery of heat has to be affected in heat exchangers which contain large volumes of air and have to be filled or emptied during the regulating operations, this is of particular importance in view of the increased possibility of undesired over-regulation taking place in such plant.

In the accompanying drawings are shown by way of example various forms of thermal power plants and parts of such plants for carrying out the new method, whereby it is assumed in all cases that air is employed as the working medium.

Fig. 2 shows a modification of a part of the plant according to Fig. 1, the supplementary control means being operated by an instrument measuring the turning moment (torque) transmitted from a turbine to the generator;

Fig. 3 shows part of a thermal power plant in which a centrifugal governor acts on a first control means and an instrument for measuring the speed acceleration acts on a supplementary control means.

Fig. 3a is a section on an enlarged scale on the line IIIa—IIIa in Fig. 3.

Figure 1:
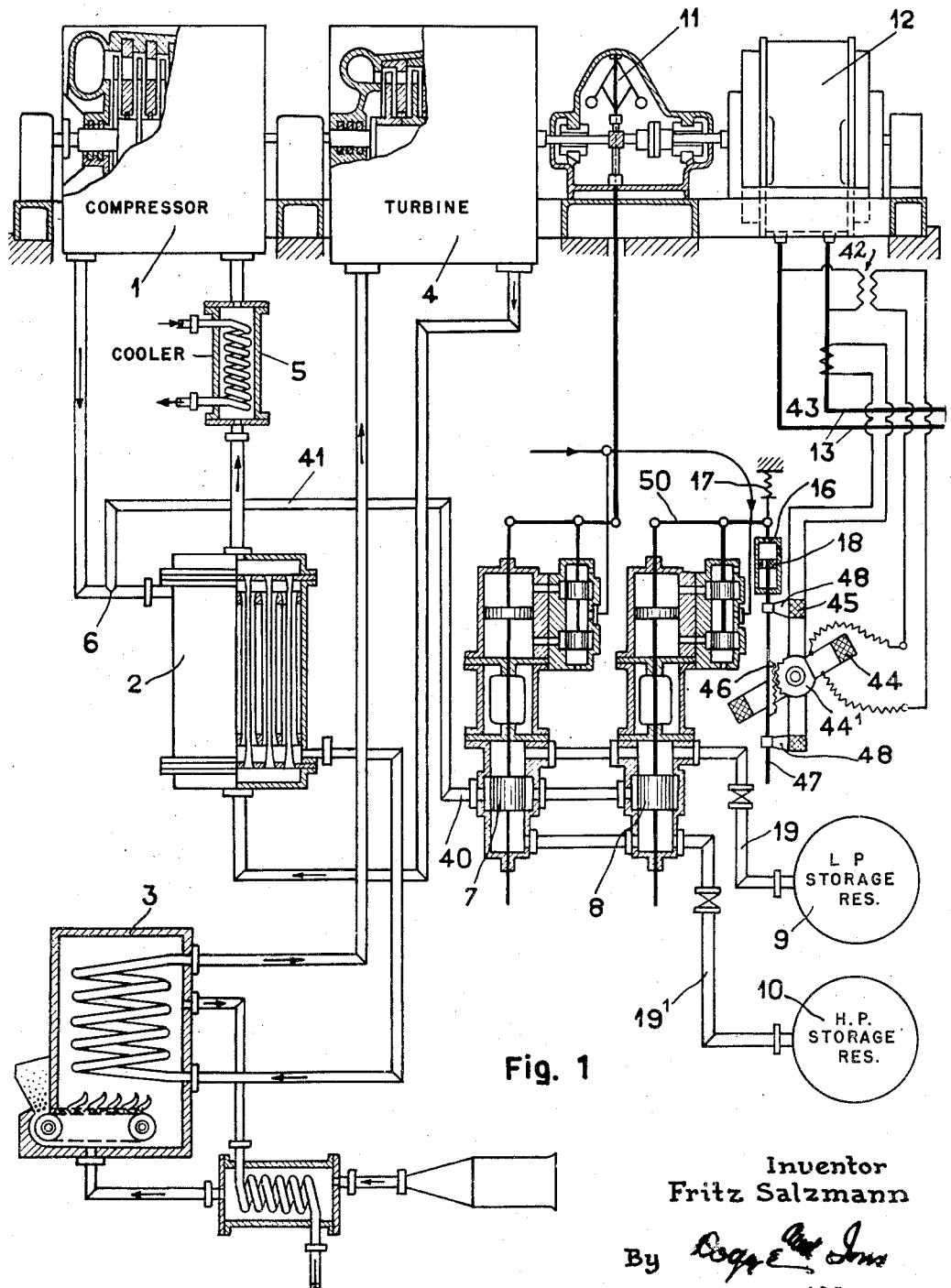
Fig. 1 shows a thermal power plant in which a centrifugal governor acts on a first control means and an instrument for measuring the power delivered by an electric generator to a service line acts on a supplementary control means.

In Fig. 1 the numeral 1 denotes the compressor, 2 the heat exchanger, 3 the heater, 4 the turbine, 5 the cooler and 12 the consumer of useful output of a thermal power plant, in which the working medium, namely air, describes a closed circuit. The direction in which the working medium circulates is indicated by arrows. At a point 6 working medium can be supplied to the circuit or withdrawn therefrom. A control member 7 designed as a slide valve, which is connected by pipes 40 and 41 to the point 6 of the circuit, connects during its downward movement said point 6 to a low-pressure storage reservoir 9, so that working medium can then pass from the circuit into said reservoir, whilst an upward movement of the slide valve 7 causes point 6 to be connected to a high-pressure storage reservoir 10 from which working medium can then flow into the circuit. A centrifugal governor 11 influenced in dependency on the speed of turbine 4 acts on valve 7 in such a manner that when an increase in speed occurs a withdrawal of working medium from the circuit takes place at point 6, whilst when a drop in speed occurs working medium is supplied to this circuit at said point 6. As consumer of useful output a generator 12 is provided, which through cables 13 is connected to a service line not shown on the drawing. To the cables 13 is connected through a voltage transformer 42 and a current transformer 43 an instrument for measuring the useful output developed. This instrument comprises a moving coil 44 and a fixed coil 45. To the moving coil 44 is rigidly connected a wheel 44¹ having a toothed sector meshing with a toothed segment 46 fixed to a rod 47 guided by brackets 48 on the fixed coil 45. The rod 47 is rigidly connected to the piston 18 of an oil dashpot 16 acted upon by a spring 17. When the current passing through the cables 13 corresponds to the normal output of the plant, said moving coil 44 assumes the position shown in Fig. 1. The dashpot 16 operates through a lever 50 a supplementary control means designed as a slide valve 8, which is normally maintained in its mid-position by said spring 17. The numeral 19 denotes a pipe connected to the low-pressure reservoir 9 and to the casings of the slide valves 7 and 8, whilst 19¹ is a pipe connected to the high-pressure reservoir 10 and to the casings of valves 7 and 8.

When slow changes in load take place, i. e. when the coil 44 is turned slowly, the supplementary valve 8 is kept practically in its mid-position by spring 17, since in such a case the moving coil 44 causes only a displacement of the piston 18, provided with a small bore, within the casing of the oil dashpot 16. The supply and withdrawal of working medium to and from the circuit is in this case controlled only by the speed governor 11 and by the valve 7 operatively connected to the latter.

When sudden changes in load take place, i. e. a quick movement of the moving coil 44 is brought about, the resistance to the movement offered by piston 18 in the oil dashpot 16 is then so great that the supplementary valve 8 is, against the force exerted by spring 17, temporarily forced out of its mid-position and then on being raised, as a consequence of a counter-clockwise movement of coil 44 out of its normal position, allows for a short time a supply of working medium to the circuit or, when moving downwards, causes working medium to be withdrawn from said circuit for a short time, these quantities of working medium being mainly dependent on the movements of coil 44 and the characteristics of the oil dashpot 16 and spring 17.

The method can also be carried out in thermal power plants in which, on a drop in load occurring, working medium withdrawn from the high-pressure section of the circuit, i. e. between the outlet of the compressor and the inlet to the turbine, can flow back without performing any work in the turbine directly to a part of the circuit that is filled with expanded working medium, i. e. to its low-pressure section. A plant for carrying out such a regulating method is shown in Fig. 2, in which the reference 52 denotes a compressor and 53 a turbine which drives this compressor and also a generator 54. A member designed as a slide valve 56 connects on being displaced downwards a pipe 57 with a pipe 58. The pipe 57 branches off at a point 59, which corresponds to point 6 of Fig. 1, from the discharge piping of the compressor 52, and the pipe 58 leads to a point 60 of the low-pressure section of the circuit of the plant. The position of the above mentioned slide valve 56 is dependent on the speed of turbine 53, since a centrifugal governor 61 influenced by the speed of this turbine is operatively connected to said slide valve 56. The connection between pipings 57 and 58 is further controlled by a supplementary slide valve 62 which is influenced through a dashpot 63 with piston 64 by an instrument for measuring the torque transmitted from turbine 53 to generator 54.

Such an instrument is known and is disclosed, for example, in the Austrian Patent 159,411 issued August 26, 1940. A collar 65 is swiveled in sleeve 65¹ and is connected by the bell-crank and link arrangement 66 with piston 64. Sleeve 65¹ is splined to hollow shaft 65² so as to turn with it, but is free to shift axially relatively thereto. Shaft $65^2$ is rigidly connected with the shaft of generator 54. A hollow hub $65^3$ fixed to the turbine shaft alines with the sleeve $65^1$ and the two have on their engaging ends inclined reaction surfaces indicated at $65^A$, so arranged that relative angular displacement of the turbine shaft with reference to the generator shaft will cause sleeve $65^1$ to move to the right against the opposition of spring $65^4$ or return to the left under the urge of said spring.

The turbine shaft and the generator shaft are connected by a torsionally yielding shaft $65^5$ which extends through hub $65^3$ and sleeve $65^1$ and affords the driving connection between turbine and generator. Shaft $65^5$ yields torsionally in proportion to the load on the generator. The effect is to adjust piston 64 up or down as the load decreases or increases respectively. If this adjustment takes place slowly then piston 64 is simply displaced inside cylinder 63 of the dashpot; if, on the other hand, the output given up by generator 54 drops suddenly, then the whole dashpot 63, 64 is moved upwards against the action of a spring 67 which tends to keep the control valve 62 in its mid-position, so that the control valve 62 is moved downwards. As a consequence, working medium flows for a short time from point 59 of the circuit through pipe 57 and past control valve 62 into pipe 58 and can thereafter reenter the circuit at point 60 in the low pressure section. This auxiliary current flowing through piping 57, 58 does not develop any output in the turbine 53. The reference 68 denotes a pipe corresponding to pipe $19^1$ of Fig. 1 and connected in the same manner as the latter to a high-pressure reservoir. When the load on the generator 54 suddenly increases, the sleeve 65 is moved to the right and the supplementary valve 62 lifted so that pressure medium can flow for a short period from said high-pressure reservoir through valve 62 into pipe 57. In this case the useful output given up by the plant drops not only on account of a reduction of the admission pressure of the turbine 53 but also owing to an increase in its back-pressure. After this lower pressure ratio has been established the supplementary slide valve 62 remains in its mid-position as long as a stationary condition prevails, whereas valve 56, which corresponds to valve 7 of Fig. 1, remains slightly displaced in the downward sense, in order that the surplus volume now issuing from compressor 52 as compared with the quantity of working medium passing through the turbine 53 can be returned from point 59 of the circuit back to point 60 of the circuit, which lies on the suction side of compressor 52.

Repeated admission of working medium as above described has the effect of increasing pressures in the circuit, but regulation continues. The effect is simply to increase the rate of flow through the by-pass for any given load. When such flow or pressures in the system reach undesirable values, working medium is discharged through a manually operated valve B, which is functionally the same as valve 46 of the patent to Keller 2,172,910, September 12, 1939.

Another possibility of supplying or withdrawing working medium for short periods to or from the circuit when sudden changes in load take place is illustrated in Figs. 3 and 3a. This embodiment of the invention bases on the fact that a sudden change in the consumption of useful output is accompanied by an acceleration or deceleration (negative acceleration) in the speed of the machines and consequently in this embodiment means are provided which are operated in dependency from such accelerations and decelerations. These means comprise a sleeve 72 surrounding, and fixed to, the spindle 70 of a centrifugal governor 71, two longitudinal grooves 73 and 74 (Fig. 3a) being provided in said sleeve 72, which are connected at the lower end to the internal space of the casing $71^1$ of governor 71. The speed of sleeve 72 has a definite relationship to the speed of the machines of the plant. The means referred to further comprise an inertia mass 75 and a torque spring 76, the latter transmitting the rotary movement of sleeve 72 to the mass 75. In the inertia mass 75 two slots 77 and 78 (Fig. 3a) are provided. 79 denotes a fixed bearing, which, together with the inertia mass 75, delimits an annular space 80. To this space 80 a pipe 81 is connected which leads to the space above a servomotor piston 82, to which space a pipe 83 for the supply of a pressure medium is likewise connected. The slots 73, 77 and 74, 78 respectively are disposed in relation to one another in such a manner that normally the pressure medium flowing to the space above servomotor piston 82 can flow off again through slots 73 and 74 in sleeve 72. The servomotor piston 82 is operatively connected to a supplementary control means designed as a slide valve 84 controlling, in the same way as slide valve 8 shown in Fig. 1, the supply and withdrawal of working medium to or from the circuit of the power plant.

If, for example, an acceleration in speed takes place then the inertia mass 75 is rotated in relation to spindle 72 in such a manner that the passage of pressure medium from slot 77 into slot 73 and from slot 78 into slot 74 is freed to a greater extent, so that the spring $82^1$, which permanently acts on the servomotor piston 82, can move the latter upwards, thus bringing about a downward movement of the controlling slide valve 84, so that working medium can then be discharged from the circuit past this slide valve 84. If one the other hand a deceleration occurs, then the passage of pressure medium into slots 73 and 74 is throttled to a greater extent, which brings about a downward movement of piston 82 and, in connection therewith, an upward movement of the controlling slide valve 84, so that working medium can be supplied through a pipe 85 into the circuit of the plant.

When slow changes in speed occur, i. e. when the acceleration or deceleration is negligible in degree, only the slide valve 86 that is acted upon by the centrifugal governor 70, 71 is displaced. The arrangement can also be designed in such a manner that the supplementary slide valve 84 only begins to open when the speed acceleration exceeds a given amount.

Figure 4:
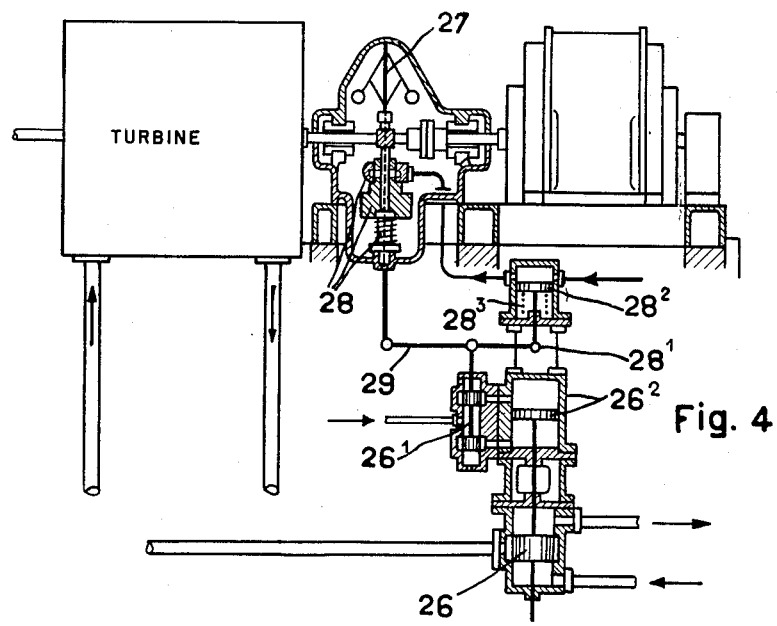
Fig. 4 shows part of a thermal power plant in which an instrument for measuring the speed acceleration and a centrifugal governor act on a common control means.

Instead of adopting a supplementary means for the sudden and brief withdrawal or supply of working medium from or to the circuit, a control means on which other regulating members also act can be additionally opened when the consumption of the consumer of useful output suddenly changes. An arrangement of this kind is illustrated in Fig. 4. In this embodiment a slide valve 26 is influenced not only by a centrifugal governor 27 but also by means 28 operated in dependency on accelerations and decelerations in the speed of the machines of the plant. These means 28 are of the same design and work in the same manner as those means 72, 75, 78 shown in Figs. 3 and 3a, which are also operated in dependency on accelerations and decelerations in the speed of the machines.

When slow increases in speed occur (acceleration practically nil) the right hand end 28¹ of a beam 29 which is connected to the centrifugal governor 27, to a piston 28² corresponding to the servomotor piston 82 of Fig. 3, and further to a controlling valve 26¹ of a servomotor 26² for operating slide valve 26, acts as a fixed fulcrum. Under the action of the centrifugal governor 27 resulting for instance from slow increases in speed, the beam 29 is turned in a clockwise sense about said end 28¹ and the controlling valve 26¹ that is linked thereto is raised, which involves a lowering of the slide valve 26, so that working medium is withdrawn from the circuit. On the other hand when quick rises in speed take place the spring 28³, which permanently acts on the piston 28², can move the latter upwards, so that the beam 29 is rocked in a counter-clockwise sense about its left hand end. As a result of the thus engendered upward movement of the controlling valve 26¹, valve 26 is additionally lowered for a short period. The same process, but in the inverse sense, takes place when rapid reductions in speed occur.

Figure 5:
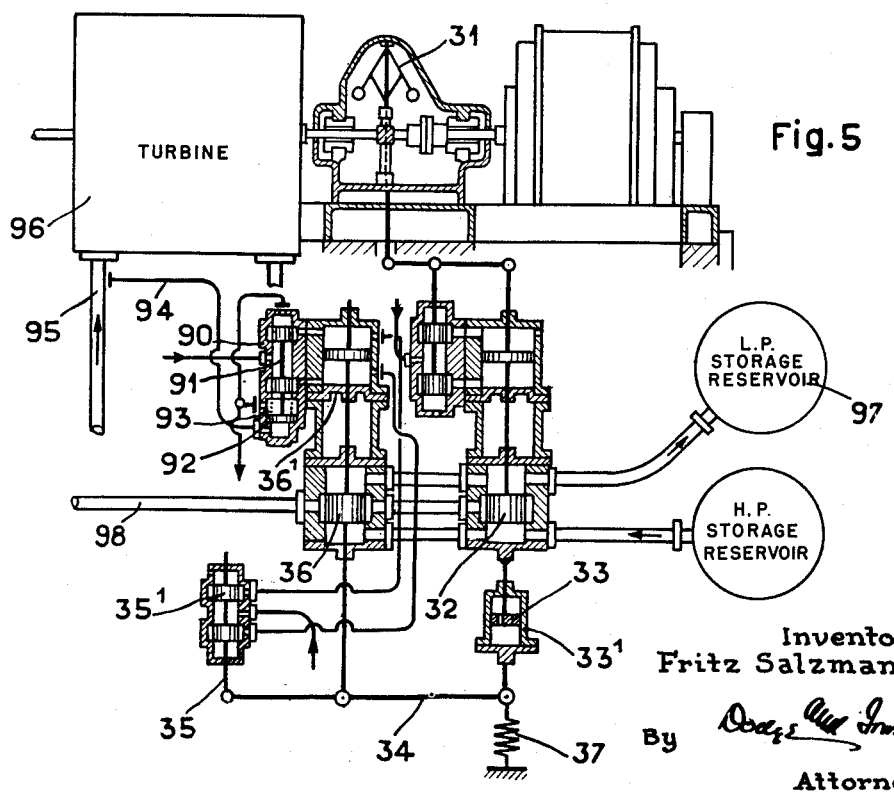
Fig. 5 shows part of a thermal power plant in which a centrifugal governor which acts permanently on a control means, further influences a second control means as soon as sudden changes in the power consumption take place.

The arrangement shown in Fig. 5 is based on utilization of the fact that a centrifugal governor 31 is caused to quickly rise or drop when sudden changes occur in the power taken up by the consumer with the consequent pronounced acceleration or deceleration of the speed. In this case too an ordinary control valve 32 is then quickly displaced. At the same time a dashpot piston 33 connected to this control valve 32 is also moved, the displacement in its position being transmitted, when a quick movement is concerned, to a beam 34 and a rod 35 connected to a controlling slide valve 35¹ allotted to a servomotor 36¹ for operating a supplementary slide valve 36. The valve 36 controls the withdrawal or supply of working medium from and to the circuit. On the other hand if the movement of the piston 33 of the dashpot is slow the casing 33¹ enclosing it will not participate in the movement, since the resistance offered by the oil contained in said casings is not sufficient to move the beam 34 against the action of a spring 37 which tends to keep valve 36 in its mid-position.

Since a relatively small control valve is sufficient for regulating slow fluctuations in load, whereas the supplementary valve for controlling the sudden and short-timed supply or withdrawal of working medium to or from the circuit generally assumes larger dimensions, it is possible to employ this supplementary control valve simultaneously also as a quick-closing valve, i. e. as a safety valve for speedily bringing the plant to a standstill in cases of emergency. To this end complete opening of the supplementary valve 36 shown in Fig. 5 can be brought about by means of a device 90 comprising a slide valve 91 normally forced against stops 92 by a spring 93. The space below this slide valve 91 is connected through a pipe 94 to the inlet pipe 95 of the turbine 96. The slide valve 91 controls the admission of a liquid having a higher pressure than that controlled by the slide valve 35¹ to the spaces on both sides of the piston of the servomotor 36¹. The slide valve 91 comes into action on a maximum admissible pressure in the inlet pipe 95 being exceeded, said valve being then moved upwards. The consequence of this is a full opening of the supplementary valve 36 in such a sense that a large amount of working medium can quickly flow out of the circuit through pipe 98 into a low-pressure reservoir 97.

What is claimed is:

1. Method for regulating the output of thermal power plants, in which at least the greater part of a gaseous working medium, preferably air, describes a circuit, is raised in at least one compressor to a higher pressure, then heated by a supply of heat from an external source and afterwards expanded in at least one turbine, and in which the weight of the working medium circulating in the circuit is varied when changes in the output taken up by a consumer of useful output driven by said turbine occur; consisting in withdrawing working medium from the high pressure section of the circuit at a rapid rate and for a short period when a sudden reduction in the output taken up by said consumer occurs, and conversely supplying working medium to said high pressure section of the circuit at a rapid rate and for a short period when an increase of the output consumed occurs; limiting the quantity of working medium so withdrawn or supplied so that it amounts to only a fraction of the total which must be withdrawn or supplied to the circuit to counteract said change in output; and withdrawing or supplying the remainder of said total gradually over longer periods of time.

2. The method defined in claim 1 further characterized in that working medium withdrawn from the high pressure section of the circuit in carrying out the claimed method is bypassed around the turbine and discharged into the low pressure section of the circuit.

3. Thermal power plant, in which at least the greater part of a gaseous working medium, preferably air, describes a circuit, comprising an external combustion source of heat by which heat is supplied to the working medium; at least one turbine in which the working medium thus heated up is allowed to expand whilst the turbine delivers power to a consumer of useful output; at least one compressor driven by said turbine for compressing the expanded working medium again to a higher pressure; means responsive to fluctuations of plant output serving to supply working medium at a gradual rate to the high-pressure section of said circuit on an increase in output occurring, and serving to withdraw such medium at a gradual rate from said high-pressure section on a drop in output occurring; and supplementary means responsive to sudden changes in plant output for effecting a sudden, brief withdrawal of working medium from the high-pressure section of said circuit when a sudden drop in output takes place and inversely for effecting a sudden, brief supply of working medium to said high-pressure section when a sudden increase in output occurs.

4. Thermal power plant, in which at least the greater part of a gaseous working medium, preferably air, describes a circuit, comprising an external combustion source of heat by which heat is supplied to the working medium; at least one turbine in which the working medium thus heated up is allowed to expand; an electric generator driven by said turbine; at least one compressor also driven by said turbine for compressing the expanded working medium again to a higher pressure; means responsive to the speed of said turbine serving to control supply of working medium to the high-pressure section of said circuit on a drop in speed occurring and withdrawal of such medium from said high-pressure section on an increase in speed occurring; means for measuring the output of said generator; and supplementary means controlled by said output measuring means and serving in response to a sudden drop in the output of said generator to cause a sudden, brief withdrawal of working medium from the high-pressure section of said circuit and in response to sudden increase in the output of the generator to cause a sudden, brief supply of working medium to said high-pressure section.

5. Thermal power plant, in which at least the greater part of a gaseous working medium, preferably air, describes a circuit, comprising an external combustion source of heat by which heat is supplied to the working medium; at least one turbine in which the working medium thus heated up is allowed to expand whilst the turbine delivers power to a consumer of useful output; at least one compressor driven by said turbine for compressing the expanded working medium again to a higher pressure; means responsive to fluctuations of plant output serving to supply working medium at a gradual rate to the high-pressure section of said circuit on an increase in output occurring and serving to withdraw such medium at a gradual rate from said high-pressure section on a drop in output occurring; and supplementary means responsive to speed changes occurring in the plant for effecting a sudden, brief withdrawal of working medium from the high-pressure section of said circuit when a sudden acceleration takes place and inversely for effecting a sudden, brief supply of a quantity of working medium to said high-pressure section when a sudden deceleration occurs.

6. Thermal power plant, in which at least the greater part of a gaseous working medium, preferably air, describes a circuit, comprising an external combustion source of heat by which heat is supplied to the working medium; at least one turbine in which the working medium thus heated up is allowed to expand whilst the turbine delivers power to a consumer of useful output; at least one compressor driven by said turbine for compressing the expanded working medium again to a higher pressure; a governor responsive to the speed of operation of the plant; a controller operated by said governor and serving in a normal range of its motion to regulate a gradual supply and withdrawal of working medium to and from the high-pressure section of said circuit on an increase or on a drop in the output occurring; and supplementary means responsive to plant output adapted to impart to said controller a sudden and additional regulatory movement when such sudden changes in plant output occur.

FRITZ SALZMANN.

REFERENCES CITED

The following references are of record in the file of this patent:

UNITED STATES PATENTS

| Number | Name | Date |
|---|---|---|
| Re. 17,161 | Innes | Dec. 11, 1928 |
| 758,010 | Kuhlewind | Apr. 19, 1904 |
| 1,666,438 | Carlstedt | Apr. 17, 1928 |
| 1,777,458 | Allen | Oct. 7, 1930 |
| 1,807,173 | Ray | May 26, 1931 |
| 2,172,910 | Keller | Sept. 12, 1939 |
| 2,203,731 | Keller | June 11, 1940 |
| 2,319,995 | Keller | May 25, 1943 |
| 2,351,079 | Strobel | June 13, 1944 |

FOREIGN PATENTS

| Number | Country | Date |
|---|---|---|
| 22,568 | Great Britain | Oct. 16, 1902 |
| 159,411 | Austria | Aug. 26, 1940 |

OTHER REFERENCES

Regulation Theory for Thermal Power Plants Employing a Closed Gas Cycle, by F. Salzmann, Zurich, Switzerland, from Transactions A. S. M. E. May 1947, pages 329 to 335.